United States Patent
Dettinger et al.

(10) Patent No.: US 7,152,074 B2
(45) Date of Patent: *Dec. 19, 2006

(54) EXTENSIBLE FRAMEWORK SUPPORTING DEPOSIT OF HETEROGENOUS DATA SOURCES INTO A TARGET DATA REPOSITORY

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 332 days.

This patent is subject to a terminal disclaimer.

(21) Appl. No.: 10/664,545

(22) Filed: Sep. 19, 2003

(65) Prior Publication Data

US 2005/0065952 A1 Mar. 24, 2005

(51) Int. Cl.
*G06F 17/30* (2006.01)
(52) U.S. Cl. ............... 707/102; 707/100; 707/101; 707/103 R; 707/104.1
(58) Field of Classification Search ................ 707/100, 707/101, 102, 103 R, 104.1
See application file for complete search history.

(56) References Cited

U.S. PATENT DOCUMENTS 4,991,087 A * 2/1991 Burkowski et al. ............ 707/3
5,321,813 A * 6/1994 McMillen et al. ........... 714/798
5,909,550 A * 6/1999 Shankar et al. ............. 709/227
6,360,536 B1 * 3/2002 Prabhu et al. ............... 60/419
6,477,572 B1 * 11/2002 Elderton et al. ............ 709/224
6,647,381 B1 * 11/2003 Li et al. ........................ 707/3
6,725,227 B1 4/2004 Li
6,867,788 B1 * 3/2005 Takeda ....................... 345/630
6,928,431 B1 * 8/2005 Dettinger et al. ............... 707/3
6,928,554 B1 * 8/2005 Dettinger et al. ........... 713/165
2002/0002661 A1 * 1/2002 Blumenau et al. .......... 711/165

FOREIGN PATENT DOCUMENTS

WO  WO 9406091 A1 * 3/1994

OTHER PUBLICATIONS

Dettinger et al., IBM U.S. Appl. No. 10/083,075 (ROC920020044USI), filed Feb. 26, 2002, "Application Portability and Extensibility Through Database Schema and Query Abstraction".
Dettinger et al., IBM U.S. Appl. No. 10/403,960 (ROC920030006USI), filed Mar. 31, 2003, "Sequenced Modification of Multiple Entities Based on an Abstract Data Representation".

* cited by examiner

*Primary Examiner*—Frantz Coby
(74) *Attorney, Agent, or Firm*—Patterson & Sheridan, LLP

(57) ABSTRACT

A method, system and article of manufacture for architecting a relationship between different representations of data. One embodiment provides a method of architecting a relationship between a first physical representation of data and a second physical representation of the data. The method comprises mapping the first physical representation to a logical model abstractly describing the second physical representation.

37 Claims, 8 Drawing Sheets

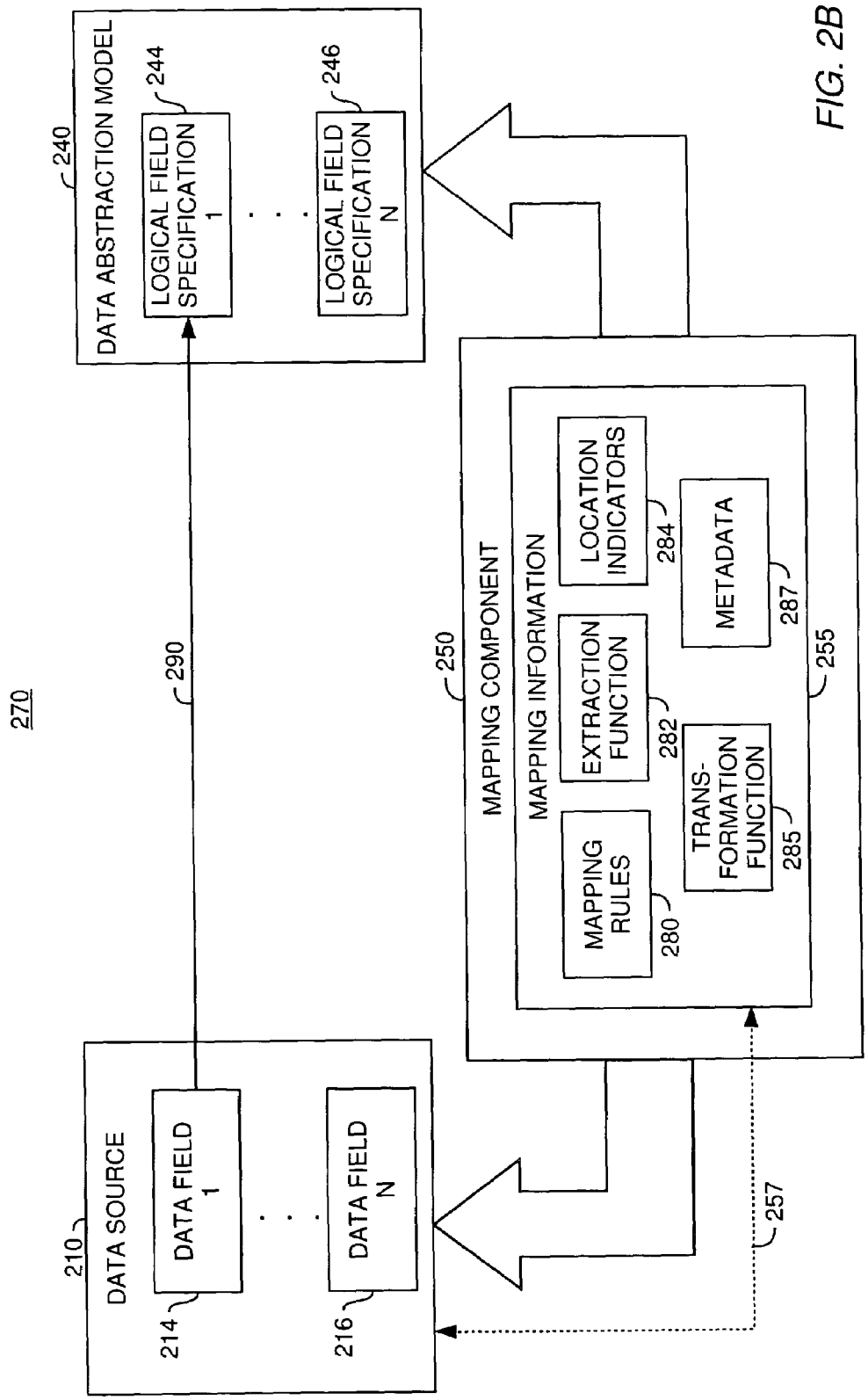

EXTENSIBLE FRAMEWORK SUPPORTING DEPOSIT OF HETEROGENOUS DATA SOURCES INTO A TARGET DATA REPOSITORY

CROSS-RELATED APPLICATION

This application is related to the following commonly owned application: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety. This application is further related to the following commonly owned U.S. patent application Ser. No. 10/403,960, filed Mar. 31, 2003, entitled "SEQUENCED MODIFICATION OF MULTIPLE ENTITIES BASED ON AN ABSTRACT DATA REPRESENTATION", which is hereby incorporated herein in its entirety.

BACKGROUND OF THE INVENTION

1. Field of the Invention

The present invention generally relates to data processing and, more particularly, to architecting a relationship between different representations of data.

2. Description of the Related Art

In various different organizations, such as research organizations, critical data frequently exists in many different formats and is generated and managed by a diverse set of individuals or groups. These individuals or groups often start by sharing information from a shared pool of data informally, for instance, via CD ROM exchange or email attachments. But as the size of such an organization grows, these informal data sharing methods become impractical and frequently lead to repeated data capture. Therefore, different methods for sharing data across individuals or groups have been developed to minimize cost associated with redundant data capture. Such methods aim to facilitate analysis and research against the shared pool of data collected within (and sometimes beyond) the organization. In particular, methods have been developed which are directed towards non-IT (Information Technology) professionals for making unique captured data available for use within the broader organization context. Accordingly, several existing software solutions are used for managing data of a shared pool of data.

One approach for managing a shared pool of data consists in implementing the shared pool of data as a physically centralized database. Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. An object-oriented programming database is one that is congruent with the data defined in object classes and subclasses.

One difficulty in implementing the shared pool of data as a physically centralized database is the requirement of transforming data in a data format from an incoming data source of the shared pool of data into a data format which is suitable for the physically centralized database. More specifically, the physically centralized database can be managed using database management software products supporting a variety of data import or load features. Products like IBM's DB2 support data import and load functions that can take data from a list of supported data formats and store this data into a target database schema. However, there are a number of limitations to this approach. For instance, data can be imported into a single database table or a view. Using a view allows for imported data to be "spread" across multiple database tables. However, a new view must be created in the database each time a new set of data involving a new set of target tables is required. Furthermore, the set of supported data formats is fixed. Data in a format that is not supported must first be converted to a supported format before it can be stored. Moreover, there is little or no accommodation for data cleansing, i.e., the need to transform incoming data into a correct data type and value domain supported by the target database schema. For example, incoming data may refer to a gender as "Female". However, a gender column in a corresponding target database table may represent gender as "0" and "1" or "M" and "F". Furthermore, mapping rules that guide importation of data are generally encoded as part of a specific application being used for data import. Changes to the mapping rules or a new set of mapping rules require changes to the specific application being used for data import. Especially, this is true of mapping rules that guide data importation which assume a given target database schema. Changes to the underlying target schema require changes to the mapping rules. Additionally, all of the data required by the target database schema may not exist in a single file that is the source for a load or import operation. Additional data can be required in addition to the data contained in the file being imported.

Another approach for managing a shared pool of data is a federated data approach. The federated data approach consists in managing the shared pool of data as a federation of different data sources. To this end, the shared pool of data can be implemented as a federated or distributed database. A federated/distributed database is one that can be dispersed or replicated among different points in a network.

The federated data approach is supported by products like IBM's DB2 Information Integrator which allow a diverse set of data source types to be viewed and accessed as if they were part of a single, logical relational schema. However, federated data query implementations rely on each data source being configured to the query execution engine where this configuration defines the location and type of each data source. This approach does not work well in an environment wherein continually new data sources are created and where the data sources are not in a centrally accessible location. This is, however, typical in organizations where researchers are continuously creating new data sources (e.g., new data spreadsheets) and where data locations are inaccessible to a federated query engine (e.g., data stored on CD ROM or on a user's private PC). Federated data query solutions are not efficient in cases where there is a desire to aggregate information from a number of different data sources. For instance, assume a situation where 100 researchers have a set of data to contribute and one wishes to run a query that spans and aggregates information across all of these data sources. In a federated data query model, each data source would be viewed as a separate logical table, requiring complex join logic and/or union of data across all of the data sources to do any kind of query spanning all of the data sources. Thus, the federated data approach is not suitable for efficiently sharing data from a large pool of data.

Therefore, there is a need for a more efficient method for managing a shared pool of data consisting of heterogeneous data sources in order to improve data sharing.

SUMMARY OF THE INVENTION

The present invention generally is directed to a method, system and article of manufacture for data processing and, more particularly, for architecting a relationship between different representations of data.

One embodiment provides a method of architecting a relationship between a first physical representation of data and a second physical representation of the data. The method comprises mapping the first physical representation to a logical model abstractly describing the second physical representation.

Another embodiment provides a method of mapping data fields between different representations of data. The method comprises providing a first physical representation of the data, providing a second physical representation of the data, providing a logical model defining a logical representation of the data described by the second physical representation, the logical model including a plurality of logical field specifications, each abstractly describing at least one of a plurality of data fields defined according to the second physical representation, providing a first plurality of mapping rules for mapping one of a plurality of data fields defined according to the first physical representation to a corresponding logical field specification of the plurality of logical field specifications of the logical model, and mapping at least one data field of the plurality of data fields defined according to the first physical representation to a corresponding logical field specification of the plurality of logical field specifications of the logical model according to the mapping rules of the first plurality of mapping rules, wherein each logical field specification of the logical model is specific to one of a plurality of logical fields and comprises a mapping rule of a second plurality of mapping rules that maps the logical field to at least one data field of the plurality of data fields defined according to the second physical representation.

Still another embodiment provides a computer readable medium containing a program which, when executed, performs a process of architecting a relationship between a first physical representation of data and a second physical representation of the data. The process comprises mapping the first physical representation to a logical model abstractly describing the second physical representation.

Still another embodiment provides a computer readable medium containing a program which, when executed, performs a process of mapping data fields between different representations of data. The process comprises receiving a first physical representation of the data, retrieving a second physical representation of the data, retrieving a logical model defining a logical representation of the data described by the second physical representation, the logical model including a plurality of logical field specifications, each abstractly describing at least one of a plurality of data fields defined according to the second physical representation, retrieving a first plurality of mapping rules for mapping one of a plurality of data fields defined according to the first physical representation to a corresponding logical field specification of the plurality of logical field specifications of the logical model, and mapping at least one data field of the plurality of data fields defined according to the first physical representation to a corresponding logical field specification of the plurality of logical field specifications of the logical model according to the mapping rules of the first plurality of mapping rules, wherein each logical field specification of the logical model is specific to one of a plurality of logical fields and comprises a mapping rule of a second plurality of mapping rules that maps the logical field to at least one data field of the plurality of data fields defined according to the second physical representation.

Still another embodiment provides a computer, comprising a database for storing data, and a mapping component for architecting a relationship between a first physical representation of the data and a second physical representation of the data. The mapping component is configured for mapping the first physical representation to a logical model abstractly describing the second physical representation.

Still another embodiment provides a computer, comprising a database for storing data, and a mapping component for mapping data fields between different representations of data. The mapping component is configured for receiving a first physical representation of the data, retrieving a second physical representation of the data, retrieving a logical model defining a logical representation of the data described by the second physical representation, the logical model including a plurality of logical field specifications, each abstractly describing at least one of a plurality of data fields defined according to the second physical representation, retrieving a first plurality of mapping rules for mapping one of a plurality of data fields defined according to the first physical representation to a corresponding logical field specification of the plurality of logical field specifications of the logical model, and mapping at least one data field of the plurality of data fields defined according to the first physical representation to a corresponding logical field specification of the plurality of logical field specifications of the logical model according to the mapping rules of the first plurality of mapping rules, wherein each logical field specification of the logical model is specific to one of a plurality of logical fields and comprises a mapping rule of a second plurality of mapping rules that maps the logical field to at least one data field of the plurality of data fields defined according to the second physical representation.

Still another embodiment provides a data structure residing in memory, comprising mapping rules for mapping data fields defined according to a first physical representation of data to corresponding logical field specifications of a logical model, each logical field specification abstractly describing at least one of a plurality of data fields defined according to a second physical representation of the data.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A–B are relational views of software components in one embodiment of the invention.

DETAILED DESCRIPTION OF THE PREFERRED EMBODIMENTS

Introduction

Figure 1:
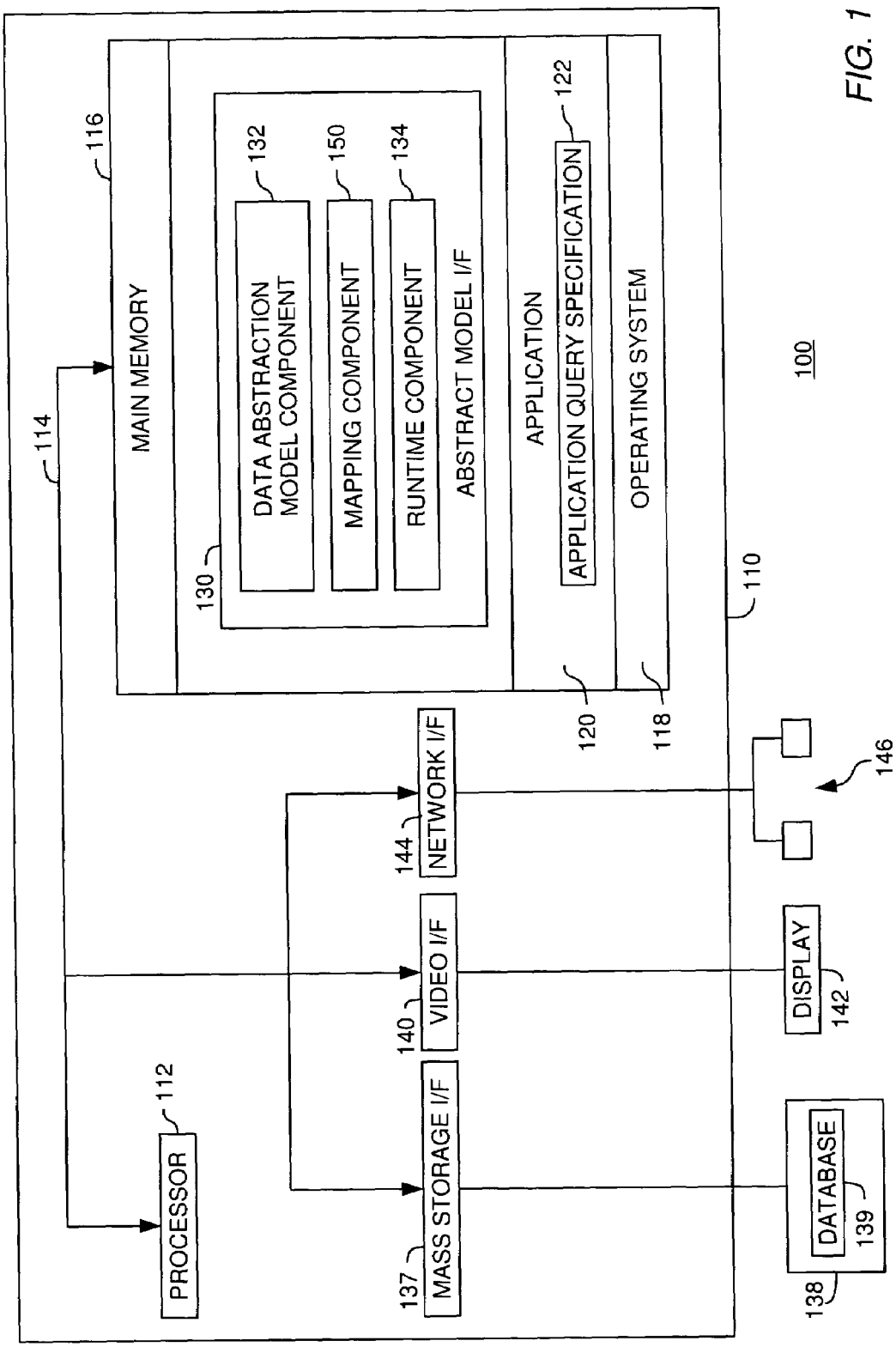
FIG. 1 is a computer system illustratively utilized in accordance with the invention.

The present invention generally is directed to a system, method and article of manufacture for data processing and, more particularly, for architecting a relationship between different representations of data. According to one aspect, a mechanism supports storage of data represented in a variety of different data formats into a target logical data repository that can be mapped to one of a plurality of underlying physical data representation formats.

In one embodiment, a first physical representation of data is mapped to a logical model abstractly describing a second physical representation. The mapping of the first physical representation to the logical model is performed by a suitable mapping component which uses mapping information. According to one aspect, the mapping information is provided with the data of the first physical representation. The mapping information describes how to process the data of the first physical representation and how to transform the data into a value domain consistent with the logical model. The mapping information includes mapping rules for mapping data fields defined by the first physical representation to logical field specifications of the logical model. The logical field specifications of the logical model are modeled against data fields of the second physical representation. Thus, by mapping the data fields of the first physical representation against the logical field specifications of the logical model, a relationship between data fields of the first and second physical representations is architected via the logical fields.

Terminology and Definitions

For clarity, the following terminology and definitions will be used to characterize features of the preferred embodiments for architecting a relationship between different representations of data. However, the terminology and definitions are only intended to clarify the description and to simplify the understanding thereof, but not to limit the present invention to these particular definitions:

(i) a physical entity of data (interchangeably referred to as a physical data entity) refers to a data item in an underlying physical representation as, e.g., the data included in a database table or in a column of the database table, i.e., to the data itself;

(ii) a data field refers to a physical arrangement of data associated with one or more physical entities of the data such as, e.g., an arrangement in the form of a database table or a column of the database table;

(iii) a physical representation of data refers to an organizational schema of the data as, e.g., a relational database schema, and may be composed of a plurality of data fields;

(iv) a logical field refers to an abstract view of data whether as an individual data item or a collection of data in the form of, for example, a database table;

(v) a logical field specification refers to a description of a logical field and comprises a mapping rule that maps the logical field to a data field(s) of a particular physical representation;

(vi) a logical representation (interchangeably referred to as a logical or data abstraction model) refers to an abstract view of a physical representation of data and may be composed of a plurality of logical field specifications; and (vii) an abstract query refers to a query that is defined using one or more logical fields and needs to be transformed into a query consistent with the physical representation of data in a database in order to be executed against the database.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PCbased server, a minicomputer, a midrange computer, a mainframe computer, and other computers adapted to support the methods, apparatus, and article of manufacture of the invention. In one embodiment, the computer system 110 is an eServer iSeries computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120 and an abstract model interface 130. The applications 120 and the abstract model interface 130 are software products comprising a plurality of instructions that are resident at various times in various memory and storage devices in the computer system 110. When read and executed by one or more processors 112 in the computer system 110, the applications 120 and the abstract model interface 130 cause the computer system 110 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation of the data. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract model interface 130. In particular, the logical fields used in the abstract queries are defined by a data abstraction model component 132 of the abstract model interface 130. The abstract queries are executed by a runtime component 134 which transforms the abstract queries into a form consistent with the physical representation of the data contained in the database 139.

The abstract model interface 130 is further configured for architecting a relationship between different representations of data. More specifically, the abstract model interface 130 architects a relationship between a first physical representation of data and a logical model abstractly describing a second physical representation. In other words, the abstract model interface 130 maps the first physical representation to the logical model, thereby creating a relationship between the first and the second physical representations of the data. The logical model is defined by the data abstraction model component 132, which may include one or more logical models. The mapping is performed using a mapping component 150. Embodiments of the mapping component 150 are further described with reference to FIGS. 2A–2B.

Figure 2A:
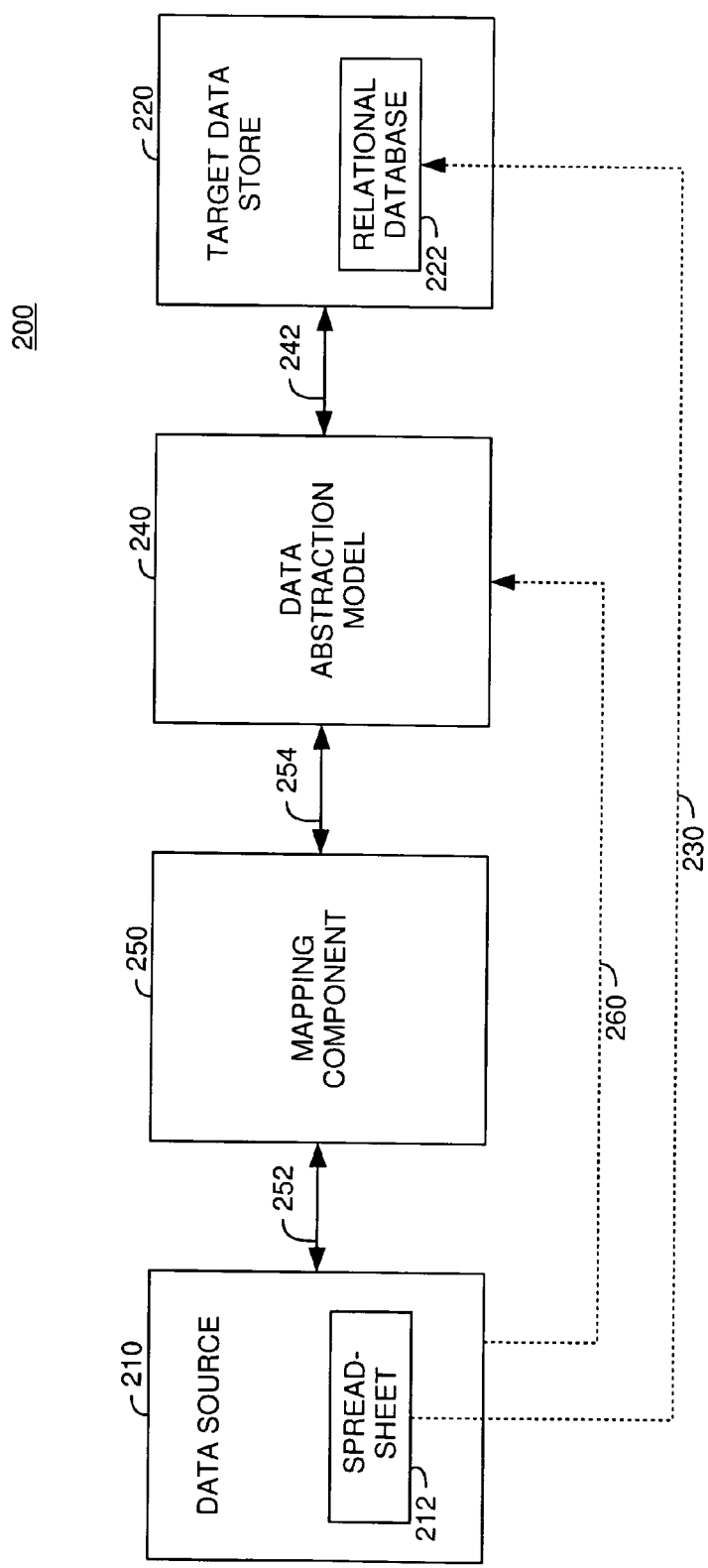

FIG. 2A shows an illustrative relational view 200 of a mapping component 250 (e.g., mapping component 150 of FIG. 1), a logical model 240 and other components of the invention. Construction and structure of a logical model is explained in more detail below reference to FIGS. 4–6. In one embodiment, the mapping component 250 is used to architect a relationship between a physical representation of a data source 210 and the logical model 240 abstractly describing a physical representation of a target data store 220. In other words, the logical model 240 and the mapping component 250 can be used to architect a relationship between the physical representation of the data source 210 and the physical representation of the target data store 220 by mapping the physical representation of the data source 210 to the logical model 240.

According to one aspect, the mapping component 250 includes mapping information (illustrated in detail in FIG. 2B as mapping information 255 and described below with reference thereto). In one embodiment, the mapping information is provided with the data source 210. The mapping information identifies information about the data source 210 and a designation of where data of the data source 210 should be deposited. In one embodiment, the mapping information identifies a method used to extract information from the data source 210. The mapping information can further include data source specific location indicators used to find the data within the data source 210. Furthermore, one or more transformation rules used to convert data from the data source 210 into a format that is acceptable to logical fields in the logical model 240 can be provided with the mapping information. The mapping information may further indicate logical fields within the logical model 240 that will be updated with information found within the data source 210. Furthermore, the mapping information can include metadata describing additional data parameters that will be used to augment the data from the data source 210 needed to generate a complete set of information to store in the target data store 220. Operation and interaction of the mapping component 250, the logical model 240 and the other components are described in more detail below with reference to FIG. 3A–B.

More specifically, FIG. 2A illustrates the data source 210 having a first physical representation and the target data store 220 having a second physical representation. By way of example, the first physical representation is illustrated as a tabular data schema in the form of a spreadsheet 212 and the second physical representation is illustrated as a relational database schema in a relational database 222 (e.g., database 139 of FIG. 1). The spreadsheet includes data which is to be deposited in the relational database 222, as indicated by dashed arrow 230.

It should be noted that the spreadsheet is merely illustrated by way of example. The invention is, however, not intended to be limited to a first physical representation defined by a spreadsheet. Instead, any known and unknown organizational schemas are contemplated as the first (and second) physical representation, such as a database schema, another spreadsheet schema, a text file schema, an audio file schema, an image file schema, an invocation of a particular web service or a combination thereof. In other words, any data source that can be processed by software and that includes a particular subset of information to be retrieved therefrom is contemplated. Furthermore, while in the following reference is made to "depositing" data and "populating" with data, it should be appreciated that this language is not intended to limit the invention to a specific operation on incoming data, such as "inserting" the incoming data into the target data store. Instead, this language should be understood as being representative for any suitable operation on the target data store based on incoming data, such as inserting, updating, deleting and other, more abstract operations.

An illustrative spreadsheet 212 is shown in Table I below.

TABLE I

SPREADSHEET EXAMPLE

| 001 | Clinical Data | | | | | |
| --- | --- | --- | --- | --- | --- | --- |
| 002 | | | | | | |
| 003 | | | | | | |
| 004 | Patient ID | Gender | Age | Race | ABO | Cause of Death |
| 005 | #1 | Female | 31 | C | O+ | ICH |
| 006 | #2 | Male | 22 | C | B+ | head trauma/CHI |
| 007 | #3 | Male | 56 | C | A+ | deathcode 203 |
| 008 | #4 | Female | 25 | C | O+ | head trauma/CHI |
| 009 | #5 | Female | 10 | C | A+ | Anoxia/cardiovascular |
| 010 | #6 | Male | 45 | C | O+ | Cerebral/Stroke |
| 011 | #7 | Male | 32 | C | A+ | ICH |
| 012 | #8 | Male | 25 | C | O+ | CHI/2-degree MVA |
| 013 | #9 | Male | 50 | B | O+ | Stroke/bleeding |
| 014 | #10 | Male | 20 | H | A+ | ICH |
| 015 | #11 | Female | 42 | C | A+ | ICH, Cerebro/Stroke |
| 016 | #12 | Male | 17 | C | O+ | CNS failure/Drugs |
| 017 | #13 | Female | 47 | C | O+ | Head trauma/CHI |
| 018 | #14 | Male | 36 | C | | |
| 019 | #15 | Male | 14 | C | B+ | head trauma/CHI |
| 020 | #16 | Male | 28 | C | A+ | head trauma/CHI |
| 021 | #17 | Female | 59 | C | A | ICH/Stroke |

TABLE I-continued

SPREADSHEET EXAMPLE

| 022 | #18 | Female | 38 | C | O+ | head trauma/CHI |
| --- | --- | --- | --- | --- | --- | --- |
| 023 | #19 | Male | 47 | C | A+ | SAH/ICB |
| 024 | #20 | Male | 17 | C | O+ | ICB |
| 025 | #21 | Male | 17 | C | | Head trauma (suicide) |
| 026 | #22 | Female | 34 | C | O+ | Head trauma |
| 027 | #23 | Male | 25 | B | O+ | Head trauma (homicide) |
| 028 | #24 | Male | 62 | C | A+ | ICH/Stroke |
| 029 | #25 | Male | 27 | C | A+ | Head trauma |
| 030 | #26 | Male | 40 | C | O+ | Head trauma |
| 031 | #27 | Female | 10 | C | | Head trauma |
| 032 | #28 | Male | 28 | C | O+ | Head Trauma |
| 033 | #29 | Male | 23 | C | O+ | Head Trauma |
| 034 | #30 | Male | 22 | A | A+ | Head trauma |
| 035 | #31 | Male | 49 | Italian | A | Stroke/bleeding |
| 036 | #32 | Female | 47 | C | A+ | Anoxia/cardiovascular |
| 037 | #33 | Female | 30 | C | A+ | ICH/Stroke |
| 038 | #34 | Female | 32 | H | O+ | ICH/Stroke |
| 039 | #35 | Male | 17 | C | B- | Brainstem Infarct |
| 040 | #36 | Female | 43 | C | A+ | CVA |
| 041 | #37 | Male | 20 | C | A+ | ICP |
| 042 | #38 | Female | 62 | C | A+ | ICH |
| 043 | #39 | Female | 63 | C | A+ | Head Trauma |
| 044 | #40 | Male | 53 | C | O+ | ICH/S/P Surgery |
| 045 | #41 | Female | 51 | C | O+ | ICH/Stroke |
| 046 | #42 | Female | 37 | C | A+ | Head trauma |
| 047 | #43 | Male | 28 | C | O+ | Head trauma |
| 048 | #44 | Female | 10 | C | A+ | Head trauma |
| 049 | #45 | Male | 47 | C | O+ | Anoxia/cardiovascular |
| 050 | #46 | Male | 20 | C | A+ | Head trauma |
| 051 | #47 | Male | 30 | C | A- | Head trauma |
| 052 | #48 | Male | 48 | C | O+ | ICH/Stroke |
| 053 | #49 | Female | 28 | B | O+ | ESRD-HD, CVA |
| 054 | #50 | Male | 3 | C | O- | ICH, Cerebro/Stroke |

The exemplary spreadsheet of Table I illustrates Clinical Data representing a listing of deceased persons. By way of example, the listing has been created by an employee in the emergency ward of a hospital. Assume now that the data included in the listing should be made available to a plurality of other departments inside or outside the hospital, such as the administration department of the hospital or a research department which performs statistical analyses concerning deceased persons in the hospital. Assume further that the hospital maintains the relational database 222, which should be populated with the data of the spreadsheet 212.

The physical representation of the relational database 222, i.e., the relational schema, is abstractly represented by the logical model 240. In other words, the logical model 240 provides an abstract view of the relational database 222, as illustrated by arrow 242. Accordingly, in one embodiment, a relationship between the tabular data schema of the spreadsheet 212 and the relational database schema of the relational database 222 can be architected by mapping the tabular data schema to the logical model 240, as illustrated by dashed arrow 260.

Mapping of the tabular data schema of the spreadsheet 212 to the logical model 240 is performed by the mapping component 250. The mapping component 250 is associated with the spreadsheet 212, i.e., with the data source 210, and includes suitable mapping information, which is further described below with reference to FIG. 2B. Thus, as illustrated by arrows 252 and 254, the mapping component 250 builds an interface between the data source 210 and the data abstraction model 240.

Referring now to FIG. 2B, a relational view 270 is shown which illustrates the data source 210, the logical model 240 and the mapping component 250 of FIG. 2A and interaction there between in more detail. The data source 210 includes one or more data fields having physical data entities. The data fields are defined according to the first physical representation. Illustratively, the data source 210 includes two data fields 214 and 216. The logical model 240 includes one or more logical field specifications, each abstractly describing at least one of a plurality of data fields defined according to the second physical representation. Illustratively, the logical model 240 includes two logical field specifications 244 and 246.

More specifically, each logical field specification 244, 246 of the logical model 240 is specific to one of a plurality of logical fields, where each logical field is related to (e.g., abstractly describes) one or more of a plurality of data fields defined according to the second physical representation. Moreover, each logical field specification 244, 246 includes a mapping rule that maps the respective logical field to a respective data field(s) of the plurality of data fields defined according to the second physical representation. According to one aspect, the second physical representation can be populated with the data from the first physical representation using the logical model 240. For instance, the spreadsheet 212 having the data in the first physical representation can be provided with an XML file including mapping information. Using the mapping information of the XML file, data fields 214, 216 of the data source 210 can be mapped to logical field specifications 244, 246 of the logical model 240. Using the logical model 240, the relational database 222 can be populated with the data from the spreadsheet 212.

An illustrative Logical Model 240 is shown in Table II below. By way of illustration, the illustrative Logical Model 240 is defined using XML. However, any other language may be used to advantage.

TABLE II

LOGICAL MODEL EXAMPLE

```
001    <?xml version="1.0"?>
002    -<DataAbstraction version="1.1"
003        xmlns="http://www.ibm.com/DataAbstraction/Model"
004        xmlns:xsi="http://www.w3.org/2001/XMLSchema-instance"
005        xsi:schemaLocation="http://www.ibm.com/DataAbstraction/Model
006                            ../DataAbstraction.xsd">
007    <Entities />
008    - <Category hidden="No" name="Clinical Data">
009    - <Field displayable="Yes" hidden="No" multiSelect="No" multiValue="No"
010           name="Case ID" nullable="Yes" outputTranslate="No" queryable="Yes"
011           rangeCapable="Yes" readonly="No" returnable="Yes" wildcards="No">
012       - <AccessMethod foreignKey="No" primaryKey="Yes">
013                    <Simple attrName="CaseID" entityName="ClinicalData" />
014         </AccessMethod>
015         <Type baseType="int" />
016       </Field>
017    - <Field displayable="Yes" existMethod="NotNull" hidden="No"
018           multiSelect="No" multiValue="No" name="Gender" nullable="Yes"
019           outputTranslate="Yes" queryable="Yes" rangeCapable="No" readonly="No"
020           returnable="Yes" translateFunction="hospdata.mapgender"
021           wildcards="No">
022       - <AccessMethod foreignKey="No" primaryKey="No">
023                    <Simple attrName="Gender" entityName="ClinicalData" />
024         </AccessMethod>
025         - <Type baseType="char">
026            - <List>
027                         <Value actualVal="F" val="Female" />
028                         <Value actualVal="M" val="Male" />
029                         <Value actualVal="U" val="Unknown" />
030            </List>
031         </Type>
032       </Field>
033    - <Field displayable="Yes" existMethod="NotNull" hidden="No"
034           multiSelect="No" multiValue="No" name="Age at Death" nullable="Yes"
035           outputTranslate="No" queryable="Yes" rangeCapable="Yes" readonly="No"
036           returnable="Yes" wildcards="No">
037       - <AccessMethod foreignKey="No" primaryKey="No">
038                    <Simple attrName="Age at Death" entityName="ClinicalData" />
039         </AccessMethod>
040         <Type baseType="int" />
041       </Field>
042    - <Field displayable="Yes" existMethod="NotNull" hidden="No"
043           multiSelect="No" multiValue="No" name="Race" nullable="Yes"
044           outputTranslate="Yes" queryable="Yes" rangeCapable="No" readonly="No"
045           returnable="Yes" translateFunction="hospdata.maphosprace"
046           wildcards="No">
047       - <AccessMethod foreignKey="No" primaryKey="No">
048                    <Simple attrName="Race" entityName="ClinicalData" />
049         </AccessMethod>
050       - <Type baseType="char">
051         - <List>
052                         <Value actualVal="C" val="Caucasian" />
053                         <Value actualVal="B" val="Black" />
054                         <Value actualVal="H" val="Hispanic" />
055                         <Value actualVal="A" val="Asian" />
```

TABLE II-continued

LOGICAL MODEL EXAMPLE

```
056                    <Value actualVal="U" val="Unkown" />
057                    <Value actualVal="I" val="Italian" />
058                    <Value actualVal="M" val="Middle Eastern" />
059                    <Value actualVal="U" val="Unknown" />
060                </List>
061            </Type>
062        </Field>
063      - <Field displayable="Yes" existMethod="NotNull" hidden="No"
064            multiSelect="No" multiValue="No" name="ABO" nullable="Yes"
065            outputTranslate="No" queryable="Yes" rangeCapable="No" readonly="No"
066            returnable="Yes" wildcards="No">
067        - <AccessMethod foreignKey="No" primaryKey="No">
068              <Simple attrName="ABO" entityName="ClinicalData" />
069          </AccessMethod>
070        - <Type baseType="char">
071              <TypeAttr name="UpperCaseValue" value="Yes" />
072              <TypeAttr name="UpperCaseCompare" value="Yes" />
073          </Type>
074        </Field>
075    </Category>
076  - <!--
077       -->
078    <Relations />
079      - <Implementation>
080            <AccessMethodImpl
081                className="com.ibm.dqa.builder.sql.SimpleSQLAccessMethod"
082                methodName="Simple" type="SQL" />
083            <AccessMethodImpl
084                className="com.ibm.dqa.builder.sql.FilteredSQLAccessMethod"
085                methodName="Filtered" type="SQL" />
086            <AccessMethodImpl
087                className="com.ibm.dqa.builder.sql.ComposedSQLAccessMethod"
088                methodName="Composed" type="SQL" />
089            <AccessMethodImpl
090                className="com.ibm.dqa.builder.sql.PostQueryProgramAccessMethod"
091                methodName="PostQueryProgram" type="SQL" />
092            <AccessMethodImpl
093                className="com.ibm.dqa.builder.sql.AlwaysTrueAccessMethod"
094                methodName="True" type="SQL" />
095            <EventProfileSource
096                className="com.ibm.dqa.abstractoperation.EventProfileDBSource"
097                type="SQL" />
098            <UDTImpl className="com.ibm.dqa.abstractdata.ICD9FieldType"
099                typeName="ICD9" />
100            <UDTImpl className="com.ibm.dqa.abstractdata.DRGFieldType"
101                typeName="DRG" />
102        </Implementation>
103        <Authorization />
104    </DataAbstraction>
```

Illustratively, the logical model shown in Table II includes five field specifications (lines 009–016, lines 017–032, lines 033–041, lines 042–062 and lines 063–074) defining five different logical fields. The logical field defined in lines 009–016, illustratively includes attributes contained in the field specification. The attributes contain abstract properties having physical location properties. For example, in line 010, a field name attribute "name" is illustrated having the value "Case ID". In other words, the logical field defined in lines 009–016 is named "Case ID". Furthermore, in lines 012–014, an exemplary access method attribute "Access-Method" of the field specification is illustrated having the value "Simple" and the abstract properties "attrName" and "entityName". These abstract properties have the values "Case ID" and "ClinicalData", respectively. In the case of a "Simple" attribute, the values map the corresponding logical field to a specific data field of the second physical representation. For instance, assume a relational database environment as second physical representation having a database table "ClinicalData" having a column "Case ID". The logical field specification in lines 009–016 is thus mapped to the column "Case ID" in the database table "ClinicalData".

In addition to field specifications, the logical model may include metadata such as relation information for linking, for instance, different access methods to different Java classes implementing the access methods. The logical model shown in Table II includes relation information in lines 078–103. Illustratively, an access method implementation link is defined in lines 080–082. This link associates an access method having the name ("methodName") "Simple" of the type ("type") "SQL" as specified in line 082 to a Java class with the name ("className") "com.ibm.dqa.builder-.sql.SimpleSQLAccessMethod" as indicated in line 081.

Illustratively, the logical model shown in Table II abstractly describes a relational database schema as the second physical representation. A logical model as well as attributes and abstract properties of a logical model are described in more detail below with reference to FIG. 4. The logical model of Table II is defined such that the exemplary spreadsheet shown in Table I above can be mapped thereto, using the mapping component 250.

More specifically, the mapping component 250 maps the data source 210 to the logical model 240, thereby architecting a relationship between the data source 210 and the second physical representation. To this end, the mapping component 250 maps at least one data field of the plurality of data fields 214, 216 to a corresponding logical field specification 244, 246 of the logical model 240 on the basis of mapping information 255 provided with the data source 210, as indicated by dashed arrow 257. This allows the physical representation of the target data store to vary and change without a need for changing the mapping information 255. Furthermore, the same mapping information 255 can be used for architecting a relationship between the physical representation of the data source 210 and a variety of physical representation models of different underlying target data stores via suitable logical models.

Illustratively, the mapping information 255 includes mapping rules 280, an extraction function 282, location indicators 284, a transformation function 285 and other metadata 287. The mapping rules 280 are adapted for mapping data fields defined according to a physical representation to corresponding logical field specifications of a plurality of logical field specifications of an appropriate logical model. Illustratively, the mapping component 250 associates the data field 214 of the data source 210 with the logical field specification 244 of the logical model, as indicated by arrow 290, using the mapping rules 280. The extraction function 282 is adapted for extracting physical data entities from the data fields 214, 216. The extracted physical data entities can be stored to a plurality of data fields defined according to the second physical representation using the logical model 240. The location indicators 284 are adapted for indicating locations of the physical data entities in the first physical representation. Accordingly, the physical data entities can be extracted from the locations indicated by the location indicators. The transformation function 285 is adapted for transforming a first data format according to the first physical representation into a second data format according to the logical model 240. In one embodiment, physical data entities having the second data format can be stored to corresponding data fields defined according to the second physical representation using the logical model 240. In another embodiment, a transformation of the second data format into a third data format according to the second physical representation may be required. Accordingly, the logical model 240 can be viewed as a normalized representation of data that can be mapped into (from the first physical representation) or mapped from (into the second physical representation). Furthermore, the transformation function 285 may represent a set of transformation functions. Thus, a plurality of transformation functions can be applied in sequence for performing a required transformation. For instance, for a given mapping rule 280, two transformation functions can be specified. A first transformation function can convert incoming data characters from the data source 210 to upper case characters. A second transformation function can subsequently capture only the first 4 characters of the incoming data. The other metadata 287 can be provided for converting a representation of the incoming data from the first physical representation into the second physical representation using the logical model 240.

In one embodiment, the mapping information 255 is implemented as a mapping descriptor file. An illustrative mapping descriptor file is shown in Table III below. By way of illustration, the illustrative mapping descriptor file is defined using XML. However, any other language may be used to advantage.

TABLE III

MAPPING DESCRIPTOR FILE EXAMPLE

```
001    <?xml version="1.0" encoding="UTF-8"?>
002    -<dep:MappingDescriptor
003         MappingClass="com.ibm.dqa.plugin.mapping.ExcelAsXMLDescriptor"
004         name="ClinicalDataXMLSpreadsheet"
005         xmlns:dep="http://www.ibm.com/DataAbstraction/MappingDescriptor"
006         xmlns:xsi="http://www.w3.org/2001/XMLSchema-instance"
007         xsi:schemaLocation="http://www.ibm.com/DataAbstraction/MappingDescriptor
008                             ../MappingDescriptor.xsd ">
009         <Locator name="sheetnumber" value="1" />
010         <Locator name="rowstart" value="5" ></Locator>
011       - <Validator
012              validatorClass="com.ibm.dqa.plugin.mapping.validators.FileNameValidator">
013                  <Parm name="endswith" value=".xml"/>
014         </Validator>
015       - <Map>
016              <FieldRef name="data://Clinical Data/Case ID"/>
017              <Locator name="column" value="A" />
018                 <Transform
019                    transformClass="com.ibm.dqa.plugin.mapping.transforms.FirstNumber" />
020         </Map>
021         <Map>
022              <FieldRef name="data://Clinical Data/Gender"/>
023              <Locator name="column" value="B" />
024              <Transform transformClass="com.ibm.dqa.plugin.mapping.transforms.Strip" />
025              <Value val="Unknown" whenSource="" whenNull="Yes" />
026         </Map>
027       - <Map>
028              <FieldRef name="data://Clinical Data/Age at Death"/>
029              <Locator name="column" value="C" />
030              <Value useNull="Yes" whenSource="" whenNull="Yes" />
031         </Map>
032       - <Map>
033              <FieldRef name="data://Clinical Data/Race"/>
```

TABLE III-continued

MAPPING DESCRIPTOR FILE EXAMPLE

```
034             <Locator name="column" value="D" />
035             <Value val="Caucasian" whenSource="C" />
036             <Value val="Black" whenSource="B" />
037             <Value val="Hispanic" whenSource="H" />
038             <Value val="Asian" whenSource="A" />
039             <Value val="Unknown" whenSource="" whenNull="Yes"/>
040         </Map>
041     - <Map>
042             <FieldRef name="data://Clinical Data/ABO"/>
043             <Locator name="column" value="E" />
044         </Map>
045     - <Map>
046             <FieldRef name="data://Clinical Data/Cause of Death"/>
047             <Locator name="column" value="F" />
048         </Map>
049     </dep:MappingDescriptor>
```

Illustratively, the mapping descriptor file shown in Table III is adapted for mapping the physical representation of the spreadsheet exemplified in Table I to the logical model exemplified in Table II. The illustrative mapping descriptor file identifies a name of a Java class ("MappingClass" in line 003) configured to (i.e., has "knowledge" of how to) extract data from the spreadsheet. Each other data source type requires another Java class that knows how to access the type of information found within that type of incoming data. For example, a spreadsheet would define a physical representation of data to deposit. A Java class would be provided that knows how to extract information from the spreadsheet. In this case, the location indicators may either be column references (to identify all of the values from a given column in the spreadsheet) or cell references (to identify the value in a given spreadsheet cell by row and column reference). The illustrative mapping descriptor file contains exemplary location indicators that identify locations of data to extract from the spreadsheet. For instance, in line 017 of Table III a column ("column") "A" is specified. This column "A" refers to the "Patient ID" column in the spreadsheet of Table I. However, a different data source type would require a different Java class which supports a set of location indicators that were appropriate for the type of data supported. Thus, new data source types can be supported as required.

The illustrative mapping descriptor file shown in Table III further identifies a set of logical field specifications that are, for instance, targets of a data deposit operation. Illustratively, six logical field specifications are provided in lines 016, 022, 028, 033, 042 and 046. These are references to logical field specifications found in the logical model exemplified in Table II.

In one embodiment, a data deposit operation uses the illustrative mapping descriptor file to generate a list of values to apply to each target logical field of the logical model of Table II (using the Java class and location indicators found within the illustrative mapping descriptor file to determine the list of values to use). This list of logical field specifications and corresponding values is then used to generate a set of physical database modification operations. The physical database modification operations can be supported by a framework described in commonly owned U.S. patent application Ser. No. 10/403,960, filed Mar. 31, 2003, entitled "SEQUENCED MODIFICATION OF MULTIPLE ENTITIES BASED ON AN ABSTRACT DATA REPRESENTATION".

The illustrative mapping descriptor file shown in Table III further specifies transformation rules that define how data found within the incoming data source 210 is to be transformed into a form supported by the logical model 240. Transformation rules can be specified via simple value mapping rules (e.g. in line 035: map "C" to "Caucasian") and/or via a plugin class that implements a more complex transformation logic (e.g. extract the "nth" token from the value from the data source).

Figure 3A:
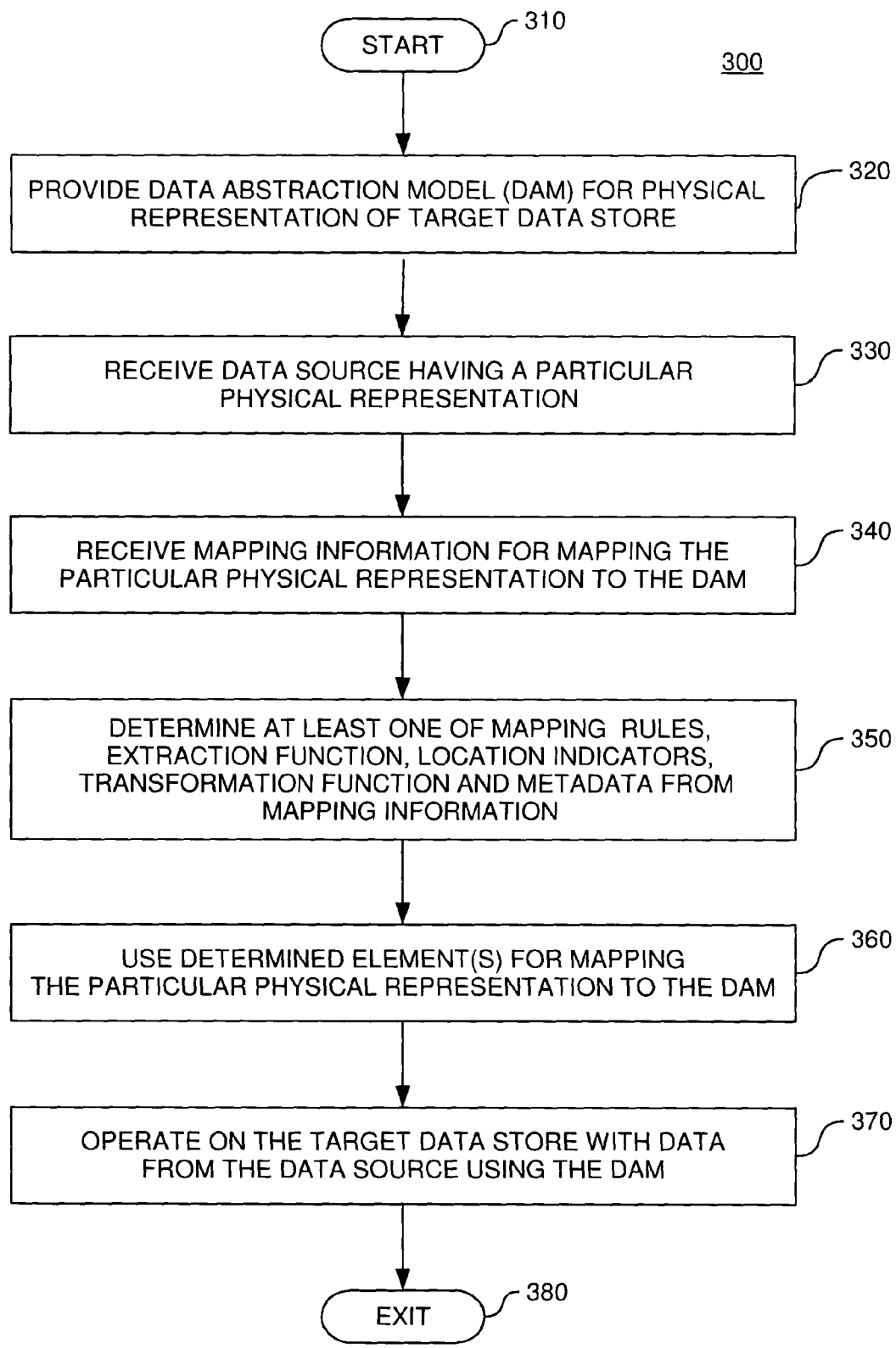
FIGS. 3A–B are flow charts illustrating interaction of the software components of FIGS. 2A–B in one embodiment of the invention.

Referring now to FIG. 3A, an exemplary method 300 for architecting a relationship between different representations of data is illustrated. In one embodiment, the method 300 is performed by the mapping component 250 of FIG. 2. The method 300 starts at step 310.

In step 320, a logical model (e.g., data abstraction model 240 of FIG. 2) is provided. The logical model abstractly describes a physical representation of a target data store (e.g., target data store 220 of FIG. 2). In step 320, a data source (e.g., data source 210 of FIG. 2) is received. The data source has a specific physical representation which is different from the physical representation of the target data store. Furthermore, in step 340 mapping information (e.g., mapping information 255 of FIG. 2B) is received. The mapping information is adapted for mapping the specific physical representation of the data source to the logical model.

In step 350, the mapping information is analyzed in order to determine information contents contained in the mapping information. In one embodiment, it is determined whether the mapping information contains at least one of mapping rules, an extraction function, location indicators, a transformation function and other metadata. In step 360 the determined information contents are used for mapping the specific physical representation of the data source to the logical model to thereby generate an association between the data source and the logical model.

In step 370, the generated association is used to drive a type of operation specified by a requesting entity. In other words, an operation is performed on the target data store with data from the data source using the logical model. The operation can be any suitable operation on the target data store based on incoming data, such as inserting, updating, and deleting. In one embodiment, the target data store is populated with the data from the data source. The method 300 then exits at step 380.

In one embodiment, if the operation specified by the requesting entity is an update or delete operation, one or more items in the target data store are updated or deleted. To this end, logical conditions or data selection conditions can be derived from information found in the data source. The logical conditions are used to identify the item(s) in the target data store that will be subjected to update or delete operations. More specifically, the data selection conditions ensure that only items associated with primary key fields are subjected to update or delete operations. Determination of the logical conditions using information from one or more logical fields and corresponding values from the data source in order to identify the item(s) in the target data store to update or delete is described in the following with reference to FIG. 3B.

Figure 3B:
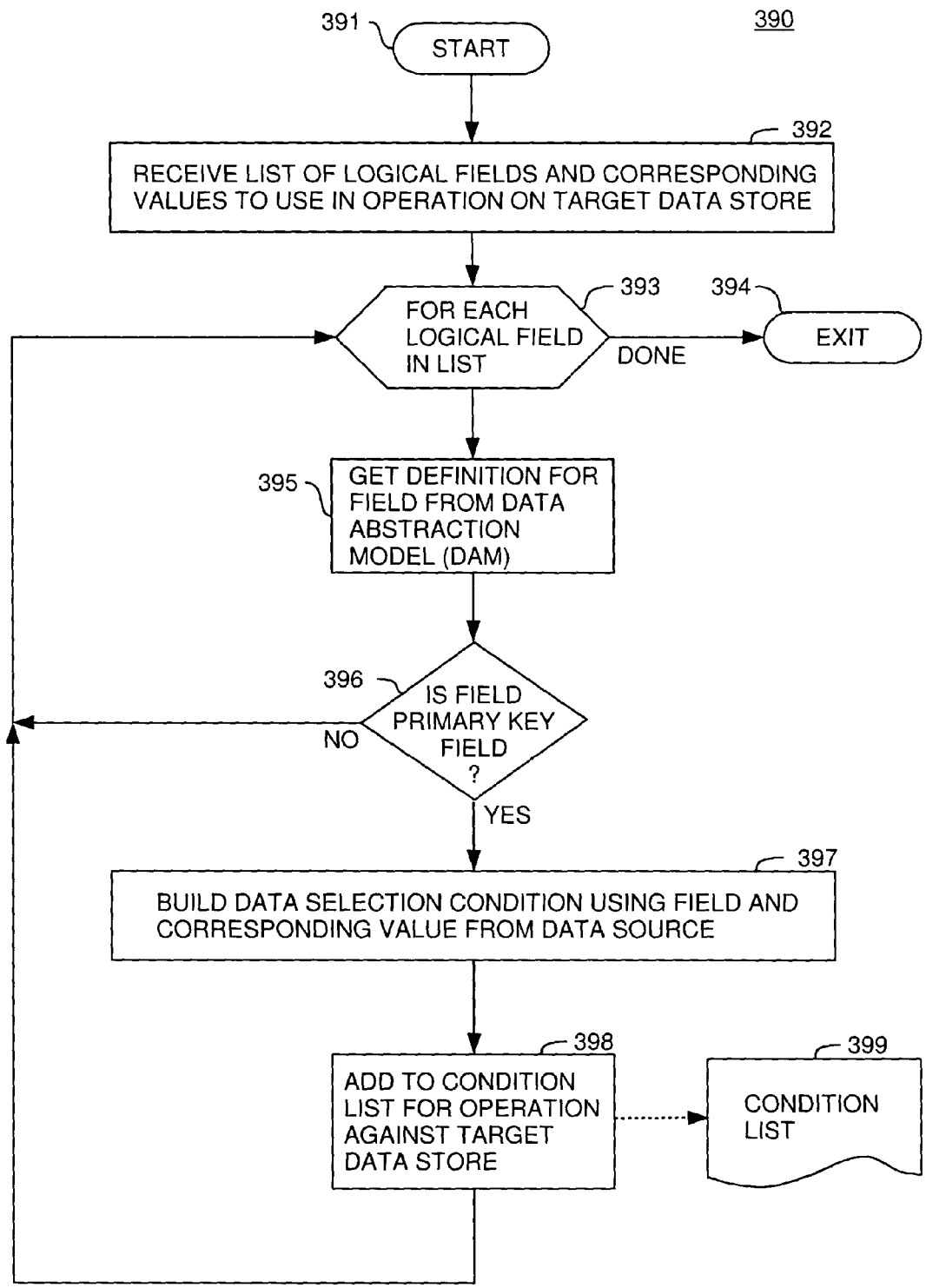

Referring now to FIG. 3B, an exemplary method 390 for determining logical conditions is illustrated. Method 390 starts at step 391. At step 392, a list of logical fields and corresponding values is received. The logical fields and the corresponding values are intended for use in an operation on the target data store (e.g., in step 370 of FIG. 3A). For each logical field in the list, a loop consisting of steps 395 to 399 is performed as explained below. When all logical fields in the list have been processed, the method 390 exits at step 394.

At step 395, for a current logical field, a corresponding definition (i.e., logical field specification) is retrieved from the logical model. At step 396 it is determined from the logical field specification whether the current logical field is a primary key field. In one embodiment, it is determined at step 396 whether the logical field specification contains an abstract property "primaryKey" with the value "Yes". For instance, the logical field defined in lines 009-016 of Table II, which is named "Case ID", illustratively includes the abstract property "primaryKey" with the value "Yes" in line 012.

If the current logical field is not a primary key field, processing returns to step 393. However, if the current field is a primary key field, a data selection condition is built at step 397. The data selection condition is built on the basis of the current logical field and the value from the data source. At step 398, the data selection condition is added to a condition list 399 for operation against the target data store. Processing then returns to step 393.

Figure 4:
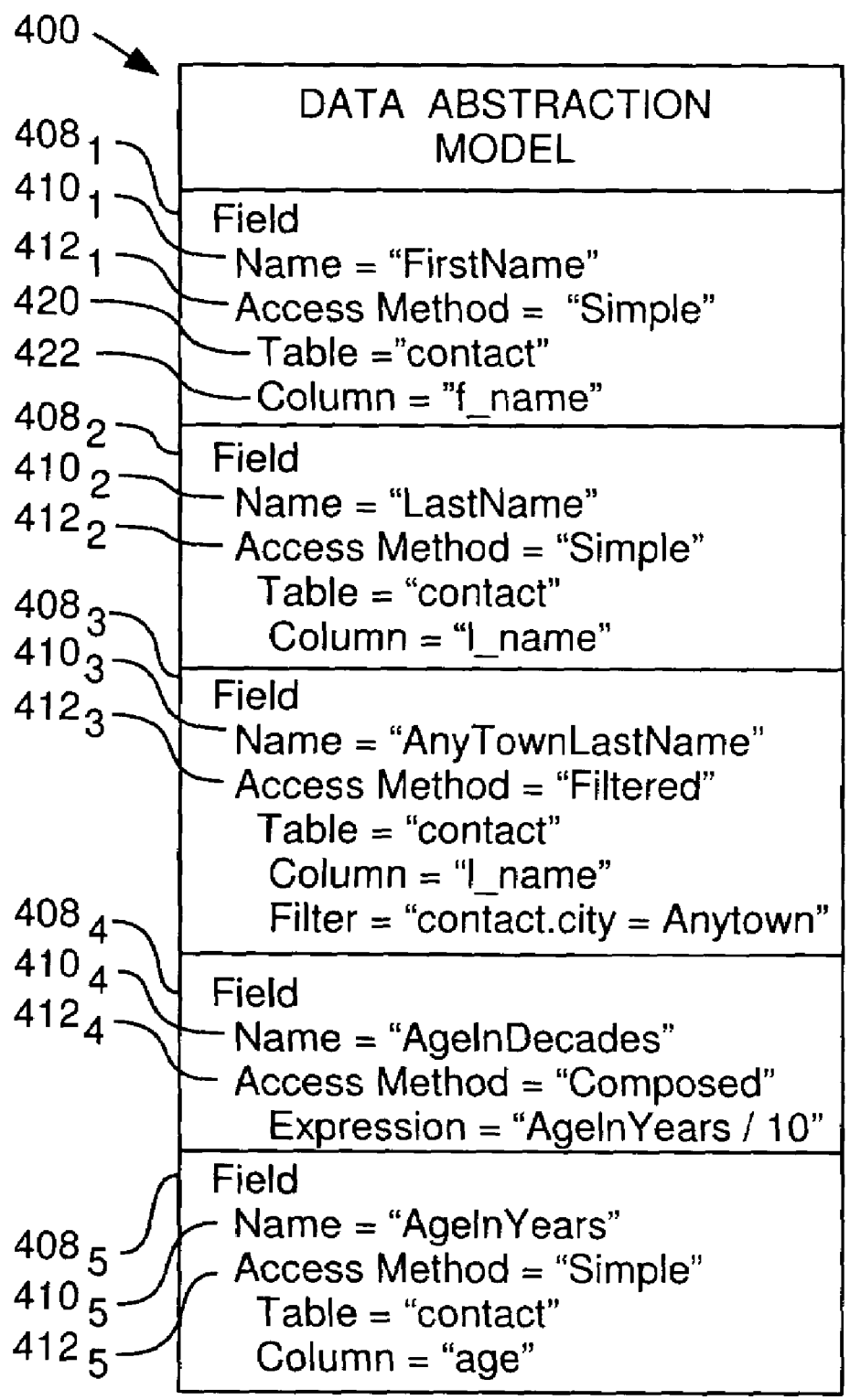
FIG. 4 is an illustration of a data abstraction model.

Referring now to FIG. 4, a more detailed illustration of one embodiment of a logical or data abstraction model 400 (e.g., an embodiment of the data abstraction model 240 of FIG. 2) is shown. The data abstraction model 400 defines logical fields corresponding to physical entities of data in a database (e.g., database 139 of FIG. 1), thereby providing a logical representation of the data. The physical entities of the data are arranged in the database according to a physical representation of the data. A mechanism for providing such a logical model for logically viewing/accessing physical data was disclosed in commonly assigned U.S. patent application Ser. No. 10/083,075 (the '075 application), filed Feb. 26, 2002 entitled "Application Portability and Extensibility Through Database Schema and Query Abstraction". The mechanism of the '075 application provides a requesting entity (i.e., an end-user or application) with a data abstraction or logical model of physical data. In this way, the requesting entity is decoupled from the underlying physical data to be accessed. Accordingly, for instance logical queries based on the logical model can be constructed without regard for the makeup of the physical data. Further, changes to the physical data do not necessitate changes to applications accessing the physical data.

In general, the data abstraction model 400 exposes information as a set of logical fields that may, for instance, be used within a query issued by an application (e.g., application 120 of FIG. 1) to specify criteria for data selection and specify the form of result data returned from a query operation (as described below with reference to FIG. 5). The term "query" should be understood as being representative for any suitable data access operation, including data modification operations, such as insert or update. In other words, the term "query" should be understood such that it would include both selection/retrieval as well as addition/modification operations. The logical fields are defined independently of the underlying physical representation being used in the database, thereby allowing queries to be formed that are loosely coupled to the underlying physical representation.

In one embodiment, the data abstraction model 400 comprises a plurality of field specifications $408_1$, $408_2$, $408_3$, $408_4$ and $408_5$ (five shown by way of example), collectively referred to as the field specifications 408. Specifically, a field specification is provided for each logical field available for composition of an abstract query. Each field specification may contain one or more attributes. Illustratively, the field specifications 408 include a logical field name attribute $410_1$, $410_2$, $410_3$, $410_4$, $410_5$ (collectively, field name 410) and an associated access method attribute $412_1$, $412_2$, $412_3$, $412_4$, $412_5$ (collectively, access method 412). Each attribute may have a value. For example, logical field name attribute $410_1$ has the value "FirstName" and access method attribute $412_1$ has the value "Simple". Furthermore, each attribute may include one or more associated abstract properties. Each abstract property describes a characteristic of a data field and has an associated value. In the context of the invention, a data field refers to a part of the underlying physical representation that is defined by one or more physical entities of the data corresponding to the logical field. In particular, an abstract property may represent a physical location property abstractly describing a location of a physical data entity corresponding to the data field, like a name of a database table or a name of a column in a database table. Illustratively, the access method attribute $412_1$ includes physical location properties 420 "Table" and 422 "Column". Furthermore, physical location property 420 "Table" has the value "contact" and physical location property 422 "Column" has the value "f_name". Accordingly, assuming an underlying relational database schema in the present example, the values of physical location properties 420 and 422 point to a table "contact" having a column "f_name".

Any number of access methods is contemplated depending upon the number of different types of logical fields to be supported. In one embodiment, access methods for simple fields, filtered fields and composed fields are provided. The field specifications $408_1$, $408_2$ and $408_5$ exemplify simple field access methods $412_1$, $412_2$, and $412_5$, respectively. Simple fields are mapped directly to a particular entity in the underlying physical representation (e.g., a field mapped to a given database table and column). By way of illustration, as described above, the simple field access method $412_1$ shown in FIG. 4 maps the logical field name $410_1$ ("FirstName") to a column named "f_name" in a table named "contact". The field specification $408_3$ exemplifies a filtered field access method $412_3$. Filtered fields identify an associated physical entity and provide filters used to define a particular subset of items within the physical representation. An example is provided in FIG. 4 in which the filtered field access method $412_3$ maps the logical field name $410_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $408_4$ exemplifies a composed field access method $412_4$. Composed access methods compute a logical field from one or more physical fields using an expression supplied as part of the access method definition. In this way, information which does not exist in the underlying physical data representation may be computed. In the example illustrated in FIG. 4 the composed field access method $412_4$ maps the logical field name $410_4$ "AgeInDecades" to "AgeIn-Years/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 408 include a type attribute which reflects the format of the underlying data. However, in another embodiment, the data format of the field specifications 408 is different from the associated underlying physical data, in which case a conversion of the underlying physical data into the format of the logical field is required.

An illustrative Data Abstraction Model 400 is shown in Table IV below. By way of illustration, the illustrative Data Abstraction Model 400 is defined using XML. However, any other language may be used to advantage.

result, abstract queries may be defined that are independent of the particular underlying physical data representation used.

The requesting entity illustrated as an application 502 (e.g., one of the applications 120 of FIG. 1) issues the abstract query 510 as defined by the respective application query specification 504 of the requesting entity. In one embodiment, the application query specification may include both criteria used for data selection and an explicit specification of the fields to be returned based on the selection criteria. The application query specification may also include a specification of data to be added to or to be updated within a target data store. For execution, the abstract query 510 is transformed into a query consistent with the underlying physical representation of the data using data abstraction model 520.

An illustrative abstract query 510 is shown in Table V below. By way of illustration, the illustrative abstract query 510 is defined using XML. However, any other language may be used to advantage.

TABLE V

ABSTRACT QUERY EXAMPLE

| | |
|---|---|
| 001 | <?xml version="1.0"?> |
| 002 | <!--Query string representation: (FirstName ="Mary" AND LastName = |

TABLE IV

DATA ABSTRACTION MODEL EXAMPLE

```
001    <?xml version="1.0"?>
002    <DataAbstraction>
003       <Category name="Demographic">
004          <Field queryable="Yes" name="FirstName" displayable="Yes">
005             <AccessMethod>
006                <Simple columnName="f_name" tableName="contact"></Simple>
007             </AccessMethod>
008             <Type baseType="char"></Type>
009          </Field>
010          <Field queryable="Yes" name="LastName" displayable="Yes">
011             <AccessMethod>
012                <Simple columnName="l_name" tableName="contact"></Simple>
013             </AccessMethod>
014             <Type baseType="char"></Type>
015          </Field>
016          <Field queryable="Yes" name="State" displayable="Yes">
017             <AccessMethod>
018                <Simple columnName="state" tableName="contact"></Simple>
019             </AccessMethod>
020             <Type baseType="char"></Type>
021          </Field>
022       </Category>
023    </DataAbstraction>
```

The access methods in lines 006, 012 and 018 associate (i.e., map) the corresponding logical field names to corresponding data fields in a database (e.g., database 139).

Figure 5:
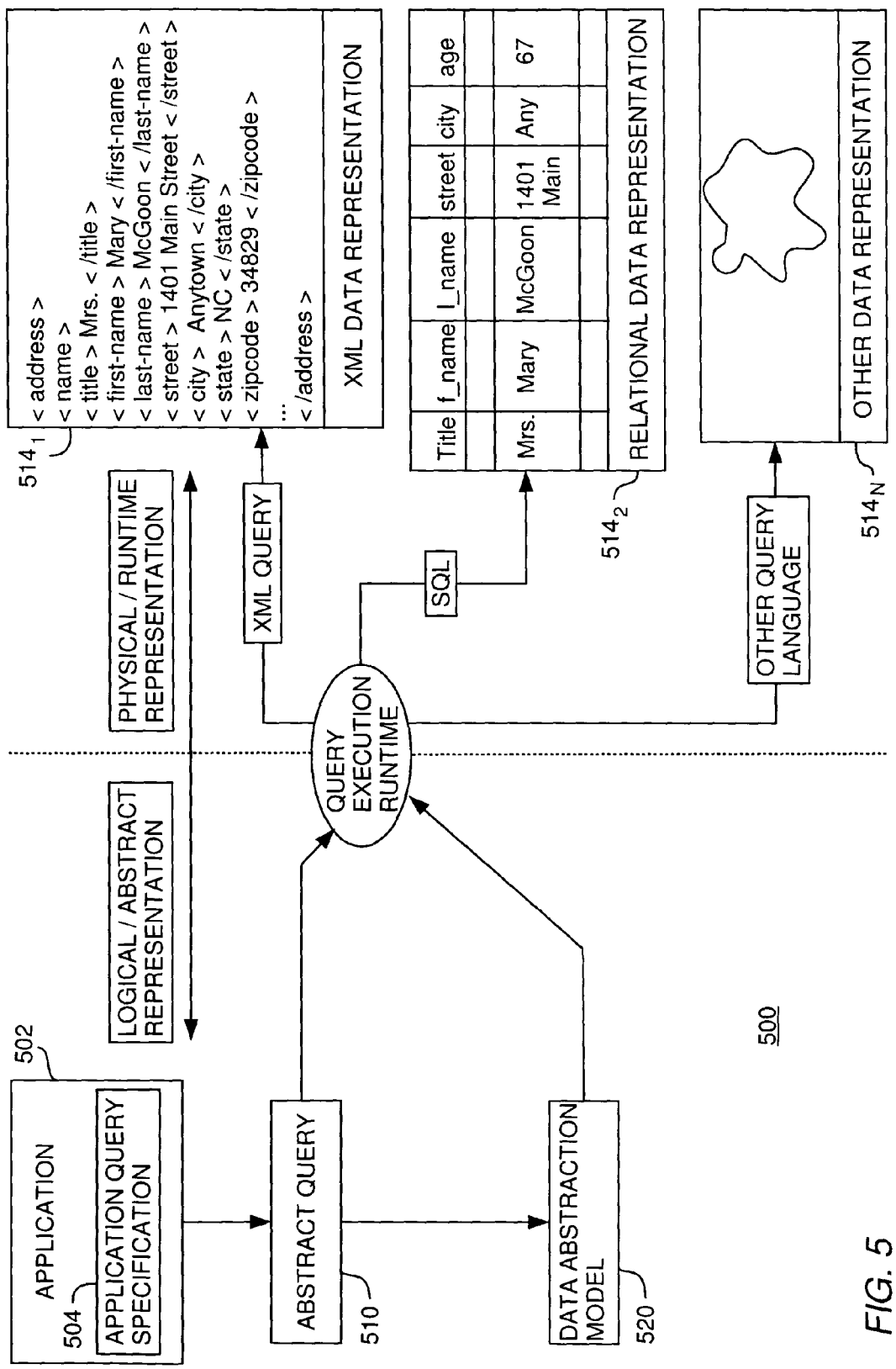
FIG. 5 is a relational view of software components using a data abstraction model.

Referring now to FIG. 5, using a logical representation of the data such as data abstraction model 520 (e.g., data abstraction model 400 of FIG. 4), an application query specification 504 (e.g., application query specification 122 of FIG. 1) may specify one or more logical fields to compose an abstract query 510. The abstract query 510 is a query which is composed according to abstract (i.e., logical) fields rather than by direct reference to underlying physical data entities in a database (e.g., database 139 of FIG. 1). As a TABLE V-continued

ABSTRACT QUERY EXAMPLE

| | |
|---|---|
| 003 | "McGoon") OR State = "NC"--> |
| 004 | <QueryAbstraction> |
| 005 |   <Selection> |
| 006 |     <Condition internalID="4"> |
| 007 |       <Condition field="FirstName" operator="EQ" value="Mary" |
| 008 | internalID="1"/> |
| 009 |       <Condition field="LastName" operator="EQ" value="McGoon" |
| 010 | internalID="3" relOperator="AND"></Condition> |

TABLE V-continued

ABSTRACT QUERY EXAMPLE

```
011             </Condition>
012             <Condition field="State" operator="EQ" value="NC"
                  internalID="2"
013     relOperator="OR"></Condition>
014         </Selection>
015         <Results>
016                 <Field name="FirstName"/>
017                 <Field name="LastName"/>
018                 <Field name="Street"/>
019         </Results>
020     </QueryAbstraction>
```

Illustratively, the abstract query shown in Table V includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, the results specification is a list of abstract fields that are to be returned as a result of query execution. A result specification in the abstract query may consist of a field name and sort criteria.

By way of example, the field specifications 408 of the data abstraction model 400 of FIG. 4 are representative of logical fields mapped to data represented in a relational data representation $514_2$ of FIG. 5. However, other instances of the data abstraction model 400 of FIG. 4 may map logical fields to other physical representations, such as XML. By way of illustration, another data representation is shown, i.e., XML data representation $514_1$. However, the physical representation $514_N$ indicates that any other data representation, known or unknown, is contemplated. In one embodiment, a single data abstraction model contains field specifications (with associated access methods) for two or more physical representations 514. In an alternative embodiment, a different single data abstraction model is provided for each separate physical representation 514.

Figure 6:
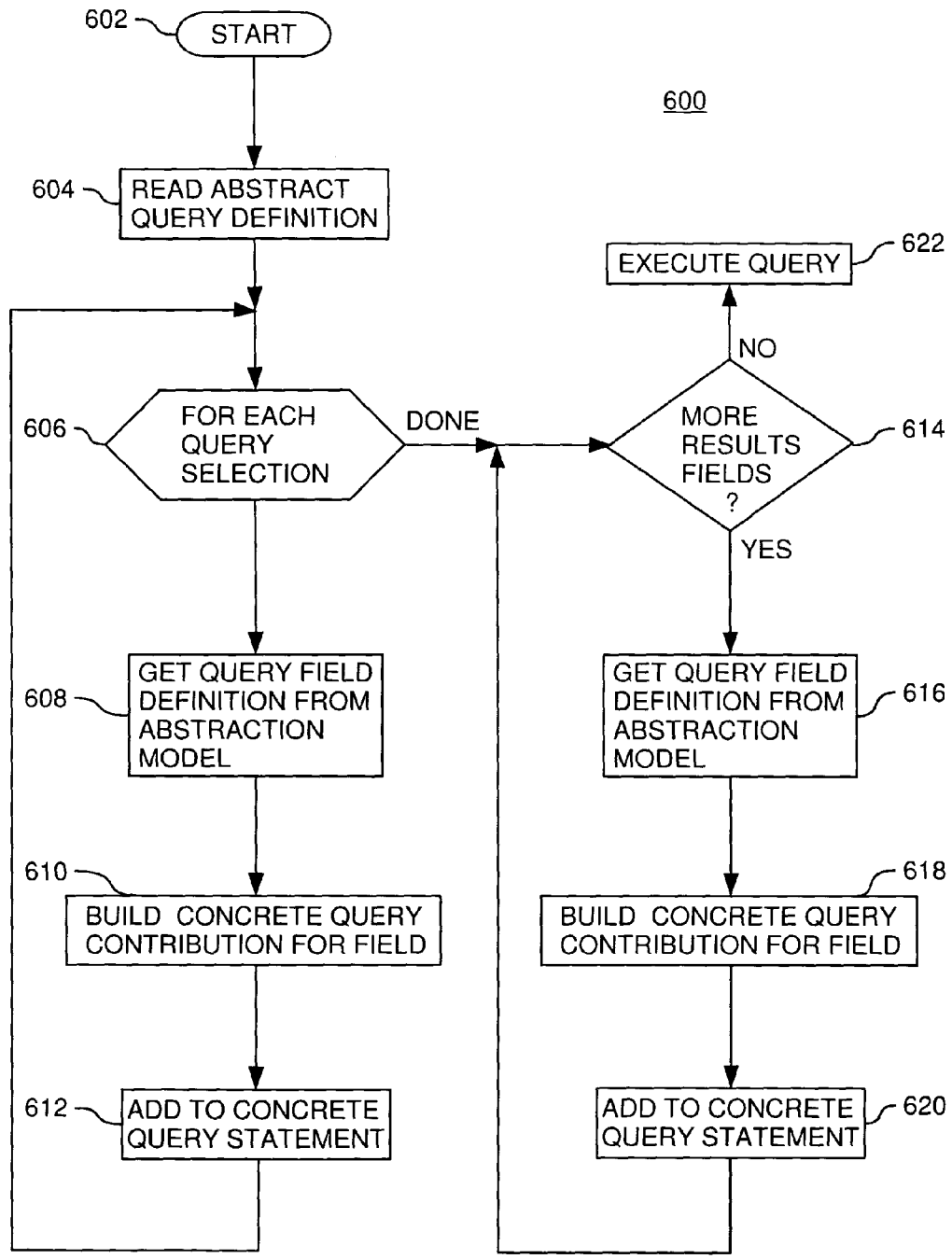
FIG. 6 is a flow chart illustrating operation of a runtime component.

FIG. 6 shows an illustrative runtime method 600 exemplifying one embodiment of the operation of the runtime component 134 of FIG. 1. The method 600 is entered at step 602 when the runtime component 134 receives as input an instance of an abstract query (such as the abstract query 510 shown in FIG. 5). At step 604, the runtime component 134 reads and parses the instance of the abstract query and locates individual selection criteria and desired result fields. At step 606, the runtime component 134 enters a loop (comprising steps 606, 608, 610 and 612) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 608, the runtime component 134 uses the field name from a selection criterion of the abstract query to look up the definition of the field in a data abstraction model (e.g., data abstraction model 240 of FIG. 2). As noted above, the field definition includes a definition of the access method used to access the physical data associated with the field. The runtime component 134 then builds (step 610) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement. The method 600 then returns to step 606 to begin processing for the next field of the abstract query. Accordingly, the process entered at step 606 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 600 enters a loop at step 614 (defined by steps 614, 616, 618 and 620) to add result field definitions to the concrete query being generated. At step 616, the runtime component 134 looks up a result field name (from the result specification of the abstract query) in the data abstraction model and then retrieves a result field definition from the data abstraction model to identify the physical location of data to be returned for the current logical result field. The runtime component 134 then builds (at step 618) a concrete query contribution (of the concrete query that identifies physical location of data to be returned) for the logical result field. At step 620, the concrete query contribution is then added to the concrete query statement. Once each of the result specifications in the abstract query has been processed, the query is executed at step 622.

In various embodiments, the invention provides numerous advantages over the prior art. In one aspect, advantages are achieved by defining a loose coupling between the different physical representations of the data. Thus, in one embodiment a mechanism for storing information that exists in a multitude of different formats and/or locations in a common format and/or location can be provided to facilitate data sharing. The mechanism supports the ability to add support for new incoming data formats. Furthermore, the mapping from information in a data source to the format used in a target data store can be described externally, avoiding the need to alter application code each time a new set of mapping rules is required. Specifically, the method used to access information from a data source can be externally described via a mapping descriptor file. Thus, support for new data formats can be accomplished via new mapping descriptor files. Likewise, mapping rules used to associate information in a data source with data fields in a target data store can also be described in the mapping descriptor file. Thus, new or updated mapping rules can be provided in the mapping descriptor file without affecting the software/hardware that performs the operations on a data source and a target data store. Moreover, data transformation and data validation logic applied to incoming data as it is stored in the format used in the target data store can be specified. The mapping descriptor file allows for simple or complex data transformation and validation rules to be encoded as part of the mapping descriptor file. This enables mapping between a value domain found within an incoming data source to a value domain supported by a logical model abstractly describing a target data store. Accordingly, incoming data can be stored in a variety of data formats, spanning multiple entities in the physical representation of the target data store. Additionally, source-to-target data mapping rules can be preserved or evolved as the physical representation of the target data store changes. Moreover, information found within an incoming data source can be augmented with additional information required by the physical representation of the target data store. For instance, a mapping descriptor file may support identification of parametric data. Thus, incoming information that is not found within an incoming data source and that must be provided by a user to augment the information needed to add to or update items in a target data store can be provided.

By mapping incoming data to an abstract data model, facilities provided by the data abstraction model approach described in the '075 application can be used to advantage to map information from an incoming data source to multiple different physical data representations. Furthermore, by using a logical model, details concerning physical data entities affected by a given abstract operation can be masked. More specifically, for instance a data deposit request which generates a series of logical field/value associations can be mapped to one or more physical insert, update or delete operations dependent on mapping information found within the logical model. Furthermore, the physical representation of a target data store can evolve with corresponding evolution to mapping information found within the logical model without affecting mapping information defined within existing mapping descriptor files.

While the foregoing is directed to embodiments of the present invention, other and further embodiments of the invention may be devised without departing from the basic scope thereof, and the scope thereof is determined by the claims that follow.

What is claimed is:

1. A method of architecting a relationship between a first physical representation of data and a second physical representation of the data, comprising:
   providing a logical model abstractly describing the second physical representation, wherein the logical model comprises a plurality of logical field definitions each comprising a logical field name, at least one location attribute identifying a location of a particular data item of the data corresponding to the logical field name, and a reference to an access method selected from at least two different access method types; wherein each of the different access methods types defines a different manner of exposing the particular data item corresponding to the logical field name of the respective logical field definition; and
   mapping the first physical representation to the logical model.

2. The method of claim 1, wherein the first physical representation defines a first plurality of data fields having the data and wherein the logical field definitions of the logical model each abstractly describe at least one of a second plurality of data fields defined according to the second physical representation.

3. The method of claim 2, wherein mapping the first physical representation to the logical model comprises mapping at least one data field of the first plurality of data fields to a corresponding logical field definition of the plurality of logical field definitions.

4. The method of claim 1, wherein the logical model is provided prior to mapping the first physical representation to the logical model.

5. The method of claim 1, further comprising populating the second physical representation with the data of the first plurality of data fields defined according to the first physical representation using the logical model.

6. The method of claim 1, wherein at least one of the first and second physical representation is one of a database schema, a spreadsheet schema, a text file schema, an audio file schema, an image file schema, an invocation of a particular web service or a combination thereof.

7. The method of claim 1, wherein the second physical representation is a database schema.

8. The method of claim 7, wherein the database schema is one of a relational, a hierarchical and an XML database schema.

9. A method of mapping data fields between different representations of data, comprising:
   providing a first physical representation of the data;
   providing a second physical representation of the data;
   providing a logical model defining a logical representation of the data described by the second physical representation, the logical model including a plurality of logical field specifications, each abstractly describing at least one of a plurality of data fields defined according to the second physical representation;
   providing a first plurality of mapping rules for mapping one of a plurality of data fields defined according to the first physical representation to a corresponding logical field specification of the plurality of logical field specifications of the logical model; and
   mapping at least one data field of the plurality of data fields defined according to the first physical representation to a corresponding logical field specification of the plurality of logical field specifications of the logical model according to the mapping rules of the first plurality of mapping rules, wherein each logical field specification of the logical model is specific to one of a plurality of logical fields and comprises a mapping rule of a second plurality of mapping rules that maps the logical field to at least one data field of the plurality of data fields defined according to the second physical representation.

10. The method of claim 9, further comprising:
    providing an extraction function for extracting physical data entities from the plurality of data fields defined according to the first physical representation;
    extracting the physical data entities from the plurality of data fields defined according to the first physical representation using the extraction function; and
    storing the extracted physical data entities to the plurality of data fields defined according to the second physical representation using the logical representation.

11. The method of claim 10, further comprising:
    providing location indicators for indicating locations of the physical data entities in the first physical representation: and
    extracting the physical data entitles from the locations indicated by the location indicators.

12. The method of claim 9, further comprising:
    providing a transformation function for transforming a first data format according to the first physical representation into a second data format according to the logical model; and
    transforming the physical data entities having the first data format into physical data entities having the second data format using the transformation function.

13. The method of claim 9, further comprising:
providing metadata for converting a representation of the data from the first physical representation into the second physical representation using the logical representation; and
converting, using the metadata, the representation of the data from the first physical representation into the second physical representation on the basis of the logical representation.

14. The method of claim 9, wherein at least one of the first and second physical representation is one of a database schema, a spreadsheet schema, a text file schema, an audio file schema, an image file schema, an invocation of a particular web service or a combination thereof.

15. The method of claim 9, wherein the second physical representation is a database schema.

16. The method of claim 15, wherein the database schema is one of a relational, a hierarchical and an XML database schema.

17. A computer readable storage medium containing a program which, when executed, performs a process of architecting a relationship between a first physical representation of data and a second physical representation of the data, the process comprising:
mapping the first physical representation to a logical model abstractly describing the second physical representation, wherein the logical model comprises a plurality of logical field definitions each comprising a logical field name, at least one location attribute identifying a location of a particular data item of the data corresponding to the logical field name, and a reference to an access method selected from at least two different access method types; wherein each of the different access methods types defines a different manner of exposing the particular data item corresponding to the logical field name of the respective logical field definition.

18. The computer readable storage medium of claim 17, wherein the first physical representation defines a first plurality of data fields having the data and the logical model comprises a plurality of logical field specifications, each abstractly describing at least one of a second plurality of data fields defined according to the second physical representation.

19. The computer readable storage medium of claim 18, wherein mapping the first physical representation to the logical model comprises:
mapping at least one data field of the first plurality of data fields to a corresponding logical field specification of the plurality of logical field specifications.

20. The computer readable storage medium of claim 17, wherein the logical model is generated prior to mapping the first physical representation to the logical model.

21. The computer readable storage medium of claim 17, wherein the process further comprises:
populating the second physical representation with the data of the first plurality of data fields defined according to the first physical representation using the logical model.

22. The computer readable storage medium of claim 17, wherein at least one of the first and second physical representation is one of a database schema, a spreadsheet schema, a text file schema, an audio file schema, an image file schema, an invocation of a particular web service or a combination thereof.

23. The computer readable storage medium of claim 17, wherein the second physical representation is a database schema.

24. The computer readable storage medium of claim 23, wherein the database schema is one of a relational, a hierarchical and an XML database schema.

25. A computer readable storage medium containing a program which, when executed, performs a process of mapping data fields between different representations of data, the process comprising:
receiving a first physical representation of the data;
retrieving a second physical representation of the data;
retrieving a logical model defining a logical representation of the data described by the second physical representation, the logical model including a plurality of logical field specifications, each abstractly describing at least one of a plurality of data fields defined according to the second physical representation;
retrieving a first plurality of mapping miss for mapping one of a plurality of data fields defined according to the first physical representation to a corresponding logical field specification of the plurality of logical field specifications of the logical model; and
mapping at least one data field of the plurality of data fields defined according to the first physical representation to a corresponding logical field specification of the plurality of logical field specifications of the logical model according to the mapping rules of the first plurality of mapping rules, wherein each logical field specification of the logical model is specific to one of a plurality of logical fields and comprises a mapping rule of a second plurality of mapping rules that maps the logical field to at least one data field of the plurality of data fields defined according to the second physical representation.

26. The computer readable storage medium of claim 25, wherein the process further comprises:
retrieving an extraction function for extracting physical data entities from the plurality of data fields defined according to the first physical representation; extracting the physical data entities from the plurality of data fields defined according to the first physical representation using the extraction function; and
storing the extracted physical data entities to the plurality of data fields defined according to the second physical representation using the logical representation.

27. The computer readable storage medium of claim 26, wherein the process further comprises:
retrieving location indicators for indicating locations of the physical data entities in the first physical representation: and
extracting the physical data entities from the locations indicated by the location indicators.

28. The computer readable storage medium of claim 25, wherein the process further comprises:
retrieving a transformation function for transforming a first data format according to the first physical representation into a second data format according to the logical model; and
transforming the physical data entities having me first data format into physical data entities having the second data format using the transformation function.

29. The computer readable storage medium of claim 25, wherein the process further comprises:

retrieving metadata for converting a representation of the data from the first physical representation into the second physical representation using the logical representation; and converting, using the metadata, the representation of the data from the first physical representation into the second physical representation on the basis of the logical representation.

30. The computer readable storage medium of claim 25, wherein at least one of the first and second physical representation is one of a database schema, a spreadsheet schema, a text file schema, an audio file schema, an image file schema, an invocation of a particular web service or a combination thereof.

31. The computer readable storage medium of claim 25, wherein the second physical representation is a database schema.

32. The computer readable storage medium of claim 31, wherein the database schema is one of a relational, a hierarchical and an XML database schema.

33. A computer, comprising:
a database for storing data; and
a mapping component for architecting a relationship between a first physical representation of the data and a second physical representation of the data, the mapping component being configured for mapping the first physical representation to a logical model abstractly describing the second physical representation, wherein the logical model comprises a plurality of logical field definitions each comprising a logical field name, at least one location attribute identifying a location of a particular data item of the data corresponding to the logical field name, and a reference to an access method selected from at least two different access method types; wherein each of the different access methods types defines a different manner of exposing the particular data item corresponding to the logical field name of the respective logical field definition.

34. A computer, comprising:
a database for storing data; and
a mapping component for mapping data fields between different representations of the data, the mapping component being configured for:
receiving a first physical representation of the data; retrieving a second physical representation of the data; retrieving a logical model defining a logical representation of the data
described by the second physical representation, the logical model including a plurality of logical field specifications, each abstractly describing at least one of a plurality of data fields defined according to the second physical representation;

retrieving a first plurality of mapping rules for mapping one of a plurality of data fields defined according to the first physical representation to a corresponding logical field specification of the plurality of logical field specifications of the logical model; and mapping at least one data field of the plurality of data fields defined according to the first physical representation to a corresponding logical field specification of the plurality of logical field specifications of the logical model according to the mapping rules of the first plurality of mapping rules, wherein each logical field specification of the logical model is specific to one of a plurality of logical fields and comprises a mapping rule of a second plurality of mapping rules that maps the logical field to at least one data field of the plurality of data fields defined according to the second physical representation.

35. A computer readable storage medium, comprising:
mapping rules for mapping data fields defined according to a first physical representation of data to corresponding logical field specifications of a logical model, each logical field specification abstractly describing at least one of a plurality of data fields defined according to a second physical representation of the data, wherein the logical model comprises a plurality of logical field definitions each comprising a logical field name, at least one location attribute identifying a location of a particular data item of the data corresponding to the logical field name, and a reference to an access method selected from at feast two different access method types: wherein each of the different access methods types defines a different manner of exposing the particular data item corresponding to the logical field name of the respective logical field definition;

an extraction function for extracting physical data entities from the data fields defined according to the first physical representation; and metadata for converting a representation of the data from the first physical representation into the second physical representation using the logical representation.

36. The computer readable storage medium of claim 35, further comprising:
location indicators for indicating locations of physical data entities in the first physical representation.

37. The computer readable storage medium of claim 35, further comprising:
a transformation function for transforming a first data format according to the first physical representation into a second data format according to the logical model.

* * * * *